Figure 1:
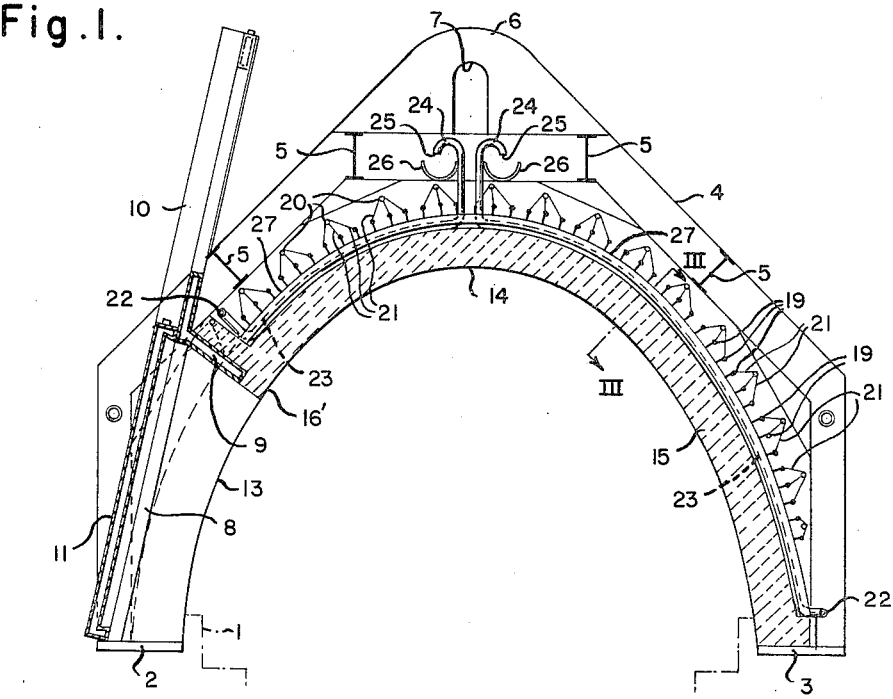

April 26, 1966  W. A. MORTON  3,247,829
FURNACE ROOF
Filed Jan. 30, 1964

INVENTOR
William A. Morton
by George R. Clark
His attorney

United States Patent Office 3,247,829
Patented Apr. 26, 1966

3,247,829
FURNACE ROOF
William A. Morton, Pittsburgh, Pa., assignor to Sunbeam Engineering Corporation, Pittsburgh, Pa., a corporation of Pennsylvania
Filed Jan. 30, 1964, Ser. No. 341,336
7 Claims. (Cl. 122—6)

This invention relates to furnace roofs formed of refractory material and is particularly adapted for use in connection with metallurgical furnaces which operate at high temperatures.

The use of refractories for metallurgical furnaces and the like is well known. In the normal operation of such a furnace, there is a steady erosion and attrition of the refractory material and it must be replaced or reconstituted from time to time. For this reason, it is routine in the ordinary course of operations of all types of metallurgical furnaces to rebuild or reline the furnaces at more or less regular intervals. The wear upon refractories is directly related to the temperature at which they operate as well as to their composition. It is common practice to cool refractories in various areas of furnaces to maintain the refractory material at satisfactory working temperatures. Various schemes such as water pipes, metal rods and the like interlaced into the refractory material and air blasts have been used at various times.

In any refractory there are bound to be local failures which require replacement of individual blocks. Furnace roofs heretofore known to me have been difficult to repair for the reason that hangers, cooling tubes and the like have been so interwoven with the brick that replacement of individual bricks has been difficult or impossible without wholesale rebuilding.

The working temperature of a given refractory is dependent upon its composition. Accordingly, some refractories operate at higher temperatures than others, and permit the furnaces in which they are used to be operated at higher effective temperatures.

In recent years there has been strong competitive pressure to operate metallurgical furnaces at higher temperatures to increase the speed of refining and reduce the cost thereof. The recent advent of cheap oxygen in commercial quantities has greatly increased the firing rates in existing furnaces which has led to an increase in operating temperatures in such furnaces. In recent years oxygen firing has been heavily used in open hearth furnaces. Heretofore roofs of open hearth furnaces have commonly been made of a refractory material comprising silica brick. Advent of higher temperatures has made it impossible to cool silica brick to keep it at desired working temperatures. In order to operate at higher temperatures with satisfactory results, so-called super silica has been developed in which the amount of impurity is reduced. Such materials have not been entirely satisfactory, however, and it has been necessary to employ a magnesite brick. Magnesite has, however, a substantially higher cost than silica, and its use markedly increases the cost of furnace operation.

I provide a furnace roof structure comprising a plurality of refractory arches formed of individual blocks of refractory material. I provide notches in the corners of said blocks whereby channels are formed in the arches along the outer surfaces thereof. I further provide conduit means positioned within the channels and adapted for the passage of coolant therethrough. I prefer to provide heat receiving surfaces extending from said conduit means for efficient transfer of large quantities of heat from the refractory to coolant passing through said conduit means. I further preferably provide means to supply coolant to the conduit means under pressure and open discharge means from said conduits for visual observation of coolant leaving the conduits.

I further prefer to provide frame means for said roof which extend above and span the refractory arches. I preferably abut said frame means upon sills which comprise the foundation for said arches and preferably form said frame means and said sills in a unitary structure. I prefer to provide support means connected to the frame means and positioned to receive hangers extending between the support means and the refractory for support of the arches.

Other details, objects and advantages of my invention will become apparent as the following description of a present preferred embodiment thereof proceeds.

Figure 2:
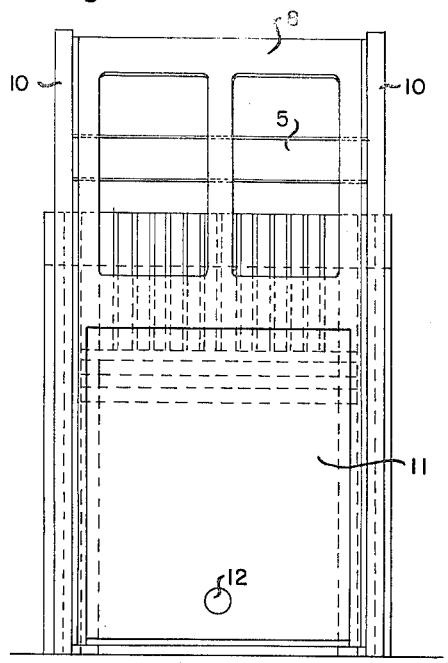
Figure 3:
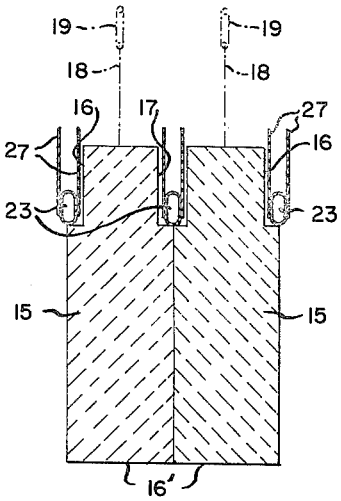

In the accompanying drawings I have illustrated a present preferred embodiment in which FIGURE 1 is an end view of an open hearth roof taken in section, showing one of the charging doors and a portion of the furnace hearth;

FIGURE 2 is a side view of a portion of the roof structure shown in FIGURE 1; and FIGURE 3 is a sectional view taken along line III—III of FIGURE 1.

The furnace roof shown in the drawings spans the hearth 1 of the furnace extending between its opposite sides. Sills 2 and 3 are formed of steel plates and rest upon the edges of the hearth. A plurality of arched structural members 4 are placed in spaced-apart side-by-side relationship extending between sills 2 and 3. I-beams 5 extend between and are welded to the arched structural members 4. At least one lifting eye 6 having an opening 7 adapted to receive a crane hook is welded to one of the structural members 4. Preferably two or more lifting eyes are welded to associated arched members 4. Structural members 4 are also welded to sills 2 and 3 so that the steel arches 4, the sills 2 and 3, and the I-beams 5 which extend between and brace the arches form a single rigid unitary structure which can be lifted by a crane having hooks on the ends of a sling. The hooks are, of course, placed through the openings 7 in the lifting eyes 6.

Adjacent each door opening, a door frame 8 is provided. The frame is of conventional type, being water-cooled and adapted to hold the door in both open and closed positions. A secondary sill 9 projects inwardly from door frame 8. Slides 10 are also formed as part of the frame 8 and a water-cooled door 11 is slidably mounted in the slides 10. Door 11 is of the conventional type having a peep hole 12. The water cooling connections and door opening and closing mechanism are well known in the art and have been omitted from the drawings for purposes of clarity.

A series of parallel abutting arches 13 extend between sills 2 and 3, one base of each arch resting on one of the sills. Where a door 11 is present, foreshortened and non-symmetrical arches 14 extend between sill 3 and secondary sill 9. The area between sill 2 and secondary sill 9 is, of course, closed by door 11 except when the furnace is to be charged. All of the arches 13 and 14 abut the adjacent arches so that a continuous refractory roof is formed. Each of arches 13 and 14 is formed of a large number of refractory bricks 15. The inner surfaces 16' are exposed to the furnace heat which flows outwardly through the bricks. Two of the outer corners are notched forming right rectangular recesses 16 in those corners of the brick. The recesses in abutting bricks forms channels 17. Wires 18 are molded into the individual bricks and terminate in a loop or eye 19.

A series of tubular supports 20 are connected to and extend between the adjacent structural members 4. Supports 20 are generally parallel to each other. They are transverse to arches 13 and 14, but at a fixed distance from the refractory surfaces. The supports may be considered as being in a plane generally concentric to the arches and outside the arches. Hangers 21 are connected to supports 20 at one end and to loops 19 at the other end. Since loops 19 are formed in the ends of wires 18 embedded in the bricks, the bricks are thereby supported by supports 20 through wires 18 and hangers 21.

Fluid supply manifolds 22 are provided extending along the bases of the arches 13 and 14. Manifolds 22 are preferably connected to a water main, but may be connected to an air supply if desired. Conduits 23 are placed in each of the channels 17 extending from the base of the arches to the highest point of the arches. Conduits 23 rest upon and are supported by the underlying refractory members. The conduits are preferably flattened or elliptical to enable larger conduits to be fitted within the channels 17. Each conduit 23 is connected at its lower end to one of the manifolds 22. The upper end of each conduit terminates at the high point of the arches in an upwardly extending goose neck 24. The goose necks have open ends 25 which turn downwardly and discharge into open drains or gutters 26. Goose necks 24 and gutters 26 may be omitted if air is used as a cooling fluid within conduits 23.

Plates 27 are welded to the conduits 23 and are in extended close proximity to faces of the brick forming the arches.

In the use of the roof structure, it is installed and the furnace is placed in operation. A cooling fluid, preferably water, is circulated through manifolds 22 and conduits 23. The water passes through conduits 23 and out at the ends of the conduits into gutters 26. In this manner the operator can tell by visual inspection at any time whether an adequate supply of cooling water is passing through each of the conduits. The refractory is a basic material having a somewhat lower melting point than other more expensive materials. Heat passing through the brick from the furnace is radiated from the brick to the plates 27 and is then transferred to the cooling water passing through conduits 23. In this manner heat transfer is greatly increased, and the mean temperature of the refractory is lowered for any given furnace operating temperature. Conversely, the furnace may be operated at higher and more efficient temperatures without exceeding the working limit of the basic refractory.

When it becomes necessary to make major repairs upon or to replace the roof, the water lines are disconnected and a crane is brought into position. Hooks on a sling are placed in lifting eyes 6 and the entire structural frame is lifted away from the hearth 1 to a convenient place. A spare roof structure which has been newly reconstructed is then swung into position and connected up, at which time the furnace may again be put into operation. Since sills 2, 3 and 9 upon which the arches rest are integral with the structural framework, the entire roof structure can readily be shifted about for rebuilding and replacement upon another furnace whose roof then needs rebuilding.

A further advantage is that if the hearth needs to be relined, it can be cooled much more quickly and easily by lifting away the furnace roof by a crane. Fans can then be directed down to the spots to be relined and the escape of heat from all over the hearth is unimpeded.

While I have illustrated and described a present preferred embodiment of my invention, it is to be understood that I do not limit myself thereto and that my invention may be otherwise variously practiced within the scope of the following claims.

I claim:
1. A furnace roof structure comprising:
(1) A plurality of refractory arches formed of individual blocks of refractory material, each of the blocks having the corners to be laid as the outer surface of the roof cut away whereby the placing of blocks in parallel and end-to-end relationship forms a plurality of channels in the outer surface of the roof;
(2) Coolant conduit means arranged for circulation of coolant therethrough placed within the channels and nonintegrated with the refractory for easier removal, the conduit means extend from the lower ends of the arches to the upper ends thereof, means supplying coolant to the lower ends of the conduit means, the upper ends of the conduit means have an open discharge means whereby flow of coolant through the conduit may be visually observed; and
(3) Heat receiving surfaces in heat exchange relationship to the conduit means and extending therefrom within the channels whereby heat is absorbed from said refractory arches into said coolant.

2. A furnace roof structure comprising:
(1) A plurality of refractory arches formed of individual blocks of refractory material, each of the blocks having the corners to be laid as the outer surface of the roof cut away whereby the placing of blocks in parallel and end-to-end relationship forms a plurality of channels in the outer surface of the roof;
(2) Coolant conduit means arranged for circulation of coolant therethrough placed within the channels, the conduit means extend from the lower ends of the arches to the upper ends thereof, means supplying coolant to the lower ends of the conduit means, the upper ends of the conduit means have an open discharge means whereby flow of coolant through the conduit may be visually observed; and
(3) Heat receiving surfaces in heat exchange relationship to the conduit means and extending therefrom within the channels whereby heat is absorbed from said refractory arches into said coolant.

3. A furnace roof structure as recited in claim 2 wherein the means supplying coolant comprises a manifold connected to the lower ends of the conduit means.

4. A furnace structure as recited in claim 2 wherein the discharge means comprises a drain disposed to receive heated coolant from the conduit means and carry it away.

5. A furnace roof structure as recited in claim 2 including a frame extending above and spanning the refractory arches, the frame having a pair of sills upon which the lower ends of the arches rest.

6. A furnace roof structure as recited in claim 5 including:
(1) A plurality of support means connected to the frame extending transverse and in close proximity to the arches; and
(2) A plurality of refractory hangers connecting the outside of refractory blocks with the support means, whereby unitary roof structure is formed.

7. A furnace roof structure as recited in claim 6 including a door frame structure having a vertical sliding door positioned in front of an opening in the arch roof for charging the furnace, the door frame resting on one of the sills.

References Cited by the Examiner

UNITED STATES PATENTS

| | | | |
|---|---|---|---|
| 919,186 | 4/1909 | Knox | 122—6 |
| 1,088,634 | 2/1914 | Slick | 122—6 |
| 1,109,553 | 9/1914 | Slick | 122—6 |
| 1,794,705 | 3/1931 | Moe et al. | 110—99 X |
| 1,799,632 | 4/1931 | Murray | 122—67 |
| 2,550,078 | 4/1951 | McDonald | 110—99 |

FOREIGN PATENTS 941,809  4/1956  Germany.

KENNETH W. SPRAGUE, *Primary Examiner.*

FREDERICK L. MATTESON, JR., JAMES W. WESTHAVER, *Examiners.*

D. G. BLACKHURST, C. J. MYHRE,
*Assistant Examiners.*